(12) United States Patent
Makwinski

(10) Patent No.: US 6,717,049 B1
(45) Date of Patent: Apr. 6, 2004

(54) SURFACE MOUNTED ELECTRICAL RACEWAYS

(75) Inventor: Mark Makwinski, Cromwell, CT (US)

(73) Assignee: The Wiremold Company, West Hartford, CT (US)

( * ) Notice: Subject to any disclaimer, the term of this patent is extended or adjusted under 35 U.S.C. 154(b) by 0 days.

(21) Appl. No.: 10/336,940

(22) Filed: Jan. 6, 2003

(51) Int. Cl.⁷ ................................................ H02G 3/04
(52) U.S. Cl. .................... 174/49; 174/68.1; 174/68.3; 439/120
(58) Field of Search ........................... 174/683, 49, 48, 174/681; 439/120; 459/209, 212; 428/40.1

(56) References Cited

U.S. PATENT DOCUMENTS

| | | | |
|---|---|---|---|
| 4,800,696 A | * 1/1989 | Miller et al. ................ | 174/48 |
| 6,202,380 B1 | * 3/2001 | Trutwin et al. ........... | 52/718.04 |
| 6,504,098 B2 | * 1/2003 | Seamans ..................... | 174/68.3 |
| 6,579,587 B2 | * 6/2003 | Schnoebelen, Jr. ......... | 428/40.1 |

* cited by examiner

*Primary Examiner*—Dhiru R Patel
(74) *Attorney, Agent, or Firm*—McCormick, Paulding & Huber LLP

(57) ABSTRACT

The raceway system gives the appearance of decorative molding such as used not only baseboard, but also as genuine chair rail molding. Also disclosed are decorative rosette blocks, and plinth blocks, that are coordinated with this decorative molding. At least some of these blocks are hollow and communicate with recesses in the adjacent molding trim pieces so that they can function as hidden electrical switches, outlet devices, and lights. Each such block has a base and a hinged or slidable cover that provides the outward appearance of a decorative rosette or plinth block.

7 Claims, 9 Drawing Sheets

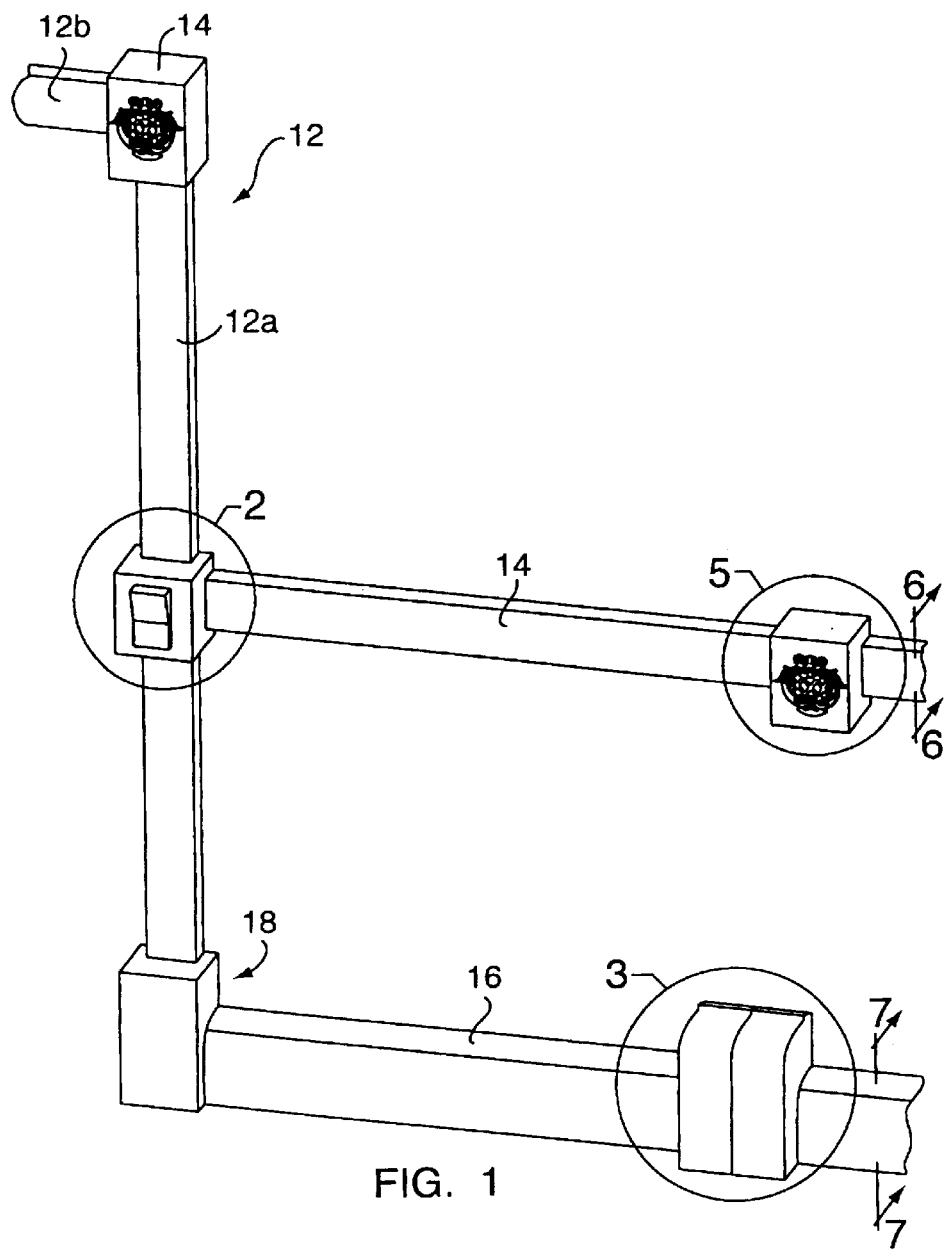
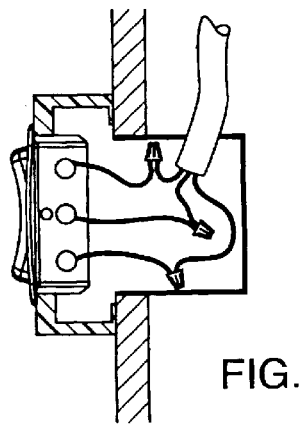
FIG. 1
FIG. 2

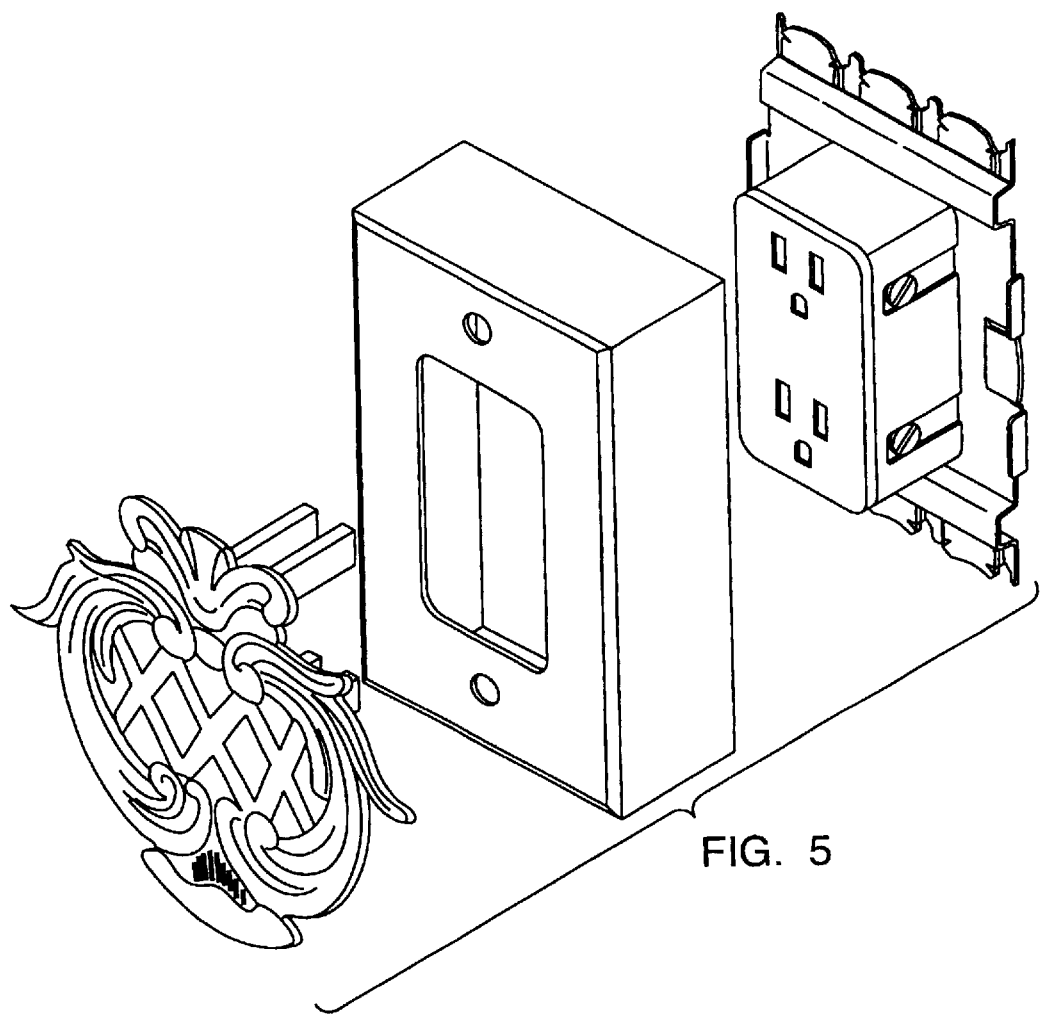
FIG. 5
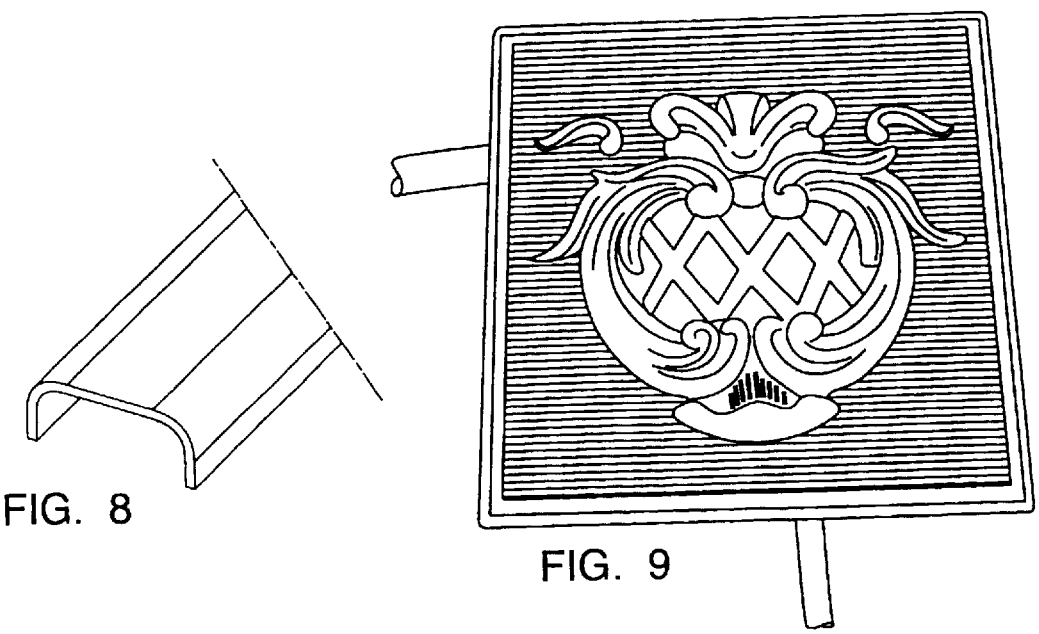
FIG. 8
FIG. 9

SURFACE MOUNTED ELECTRICAL RACEWAYS

BACKGROUND OF THE INVENTION

Surface mounted electrical raceways have evolved from the 'pipe and box' typical of commercial warehouse type electrical distribution systems to the architecturally and aesthetically more acceptable stylized systems available from sources such as The Wiremold Company of West Hartford, Conn.

The high visibility of present day surface raceway systems in modern office spaces and in public buildings such as hotels and hospitals tends to draw attention to these stylized surface mounted raceway systems. One aim of the present invention is to avoid this attention getting effect of present day systems, and to avoid the commercial/industrial ambience created by the very presence of such stylized surface mounted raceway systems.

SUMMARY OF THE INVENTION

The present invention borrows a page from the Victorian Architectural Era when relatively elaborate wood moldings were used around doorways and along walls as well as around windows to provide a formal appearance to interior spaces, both residential and commercial. The recent revival of this Victorian approach to the interior architectural decor and appearance of building structures, both new and old provides an opportunity for a novel approach to satisfy the continuing need for electrical and data/telecomm cabling as well as the associated outlet devices that users of such structures now take for granted, not only in their home and offices, but wherever they spend time, such as in hotels for example. The needs of today's users of portable and personal computers for both electrical power and data/telecomm jacks dictates that these conveniences be available to him/her in any area that he/she might frequent.

In accordance with the present invention, a building structure wall surface has base board and chair rail trim pieces that include horizontally spaced rosette blocks of generally rectangular outline such that one end of each trim piece abuts a rosette block. Preferably, similar trim pieces and rosette blocks are provided around each window and doorway to provide a decorative trim treatment in the space defined by the wall surfaces. These trim pieces and rosettes have decoratively molded front faces and generally flat rear surfaces that are adapted to be affixed to the wall surfaces. The trim pieces are formed with a rearwardly open recess extending the entire length thereof, and the rosette blocks are hollow and adapted to receive outlet devices, such as power outlet plugs or data/com jacks. The hollow rosette blocks communicate with the trim piece recesses to allow power and/or data telecom cabling to be routed from a source or sources in the wall to these outlet devices. Preferably, each trim piece is fabricated from a foamed resin and the front face shaped to define a chair rail or baseboard molding. The cross section of these trim pieces is formed to allow each elongated trim piece to be made by a plastic molding process that also results in forming the elongated rearwardly open recess that receives the cabling. A plurality of the rosette blocks are fabricated by molding base and cover portions that define the hollow interiors thereof. These rosette block covers are preferably movably mounted on their associated base to provide access to the outlet devices whether for wiring them upon installation, or for the user to plug in his/her appliance to be connected to the power grid or to a network. Additional rosette blocks, also made up of molded base and cover configuration, are provided at predetermined intervals defined by the length of the elongated trim pieces arranged in end abutting relationship to the rosette blocks. Some of these additional rosette blocks are provided with electrical outlet plugs and others with electrical lights mounted in the lower sides of these rectangular rosette blocks so that the dominant and decorative front face of the rosette block disguises the utilitarian downwardly facing lower side having the outlet plugs and lights.

In still another form the rosette blocks of the invention serve as plinth blocks and have lower edges that are flush with the lower marginal edges of the elongated trim pieces that define base board moldings. These rosette/plinth blocks are provided at doorway openings, with vertical trim pieces abutting upper edges of said plinth blocks. The vertical trim pieces have rearwardly open recesses so that the cabling can be continuously provided through these blocks to reach both said base board and said chair rail molding.

The above described components, namely the trim pieces (both door trim and baseboard/chair rail moldings) can be interchanged with conventionally formed components (without hollowed out recesses ect.) for finishing off a space such as that described above.

BRIEF DESCRIPTION OF THE DRAWINGS

FIG. 1 is an isometric view of one wall surface having a door opening with door trim and rosette blocks tied into chair rail and base board trim pieces of a type made in accordance with the present invention.

FIG. 2 is a detailed view of the on/off switch depicted in FIG. 1.

FIG. 5 is a detailed exploded view of the outlet box at 5 in FIG. 1.

FIG. 8 shows an alternative to the two piece snap together raceway of FIG. 5 and 6.

FIG. 9 shows an alternative rosette block for replacement of that in FIG. 5.

DETAILED DESCRIPTION OF THE DRAWINGS

Figure 3:
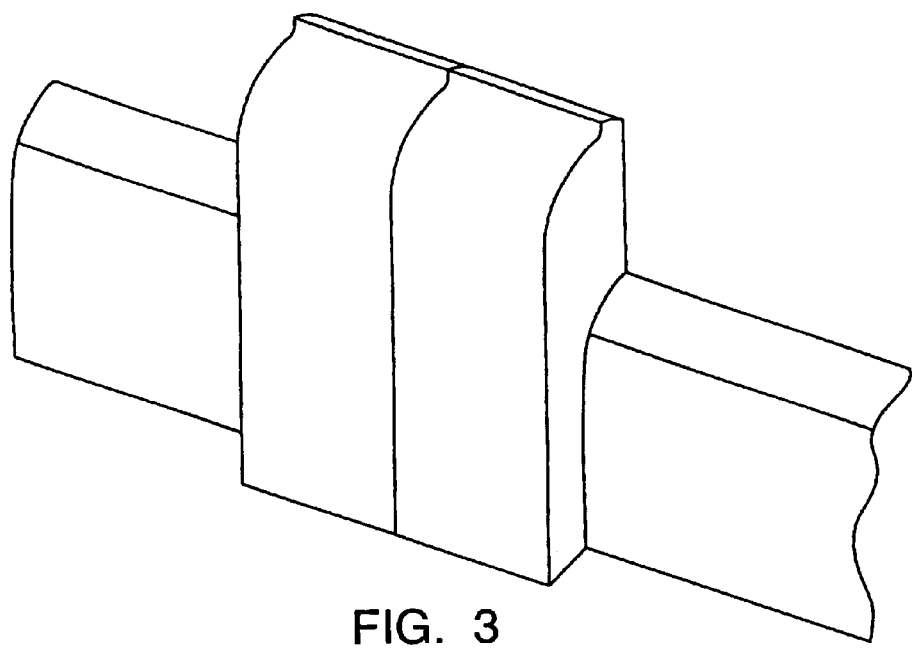
FIG. 3 is a detailed view of the closed outlet box at 3 in FIG. 1.

FIG. 1 shows a representative wall structure having an electrical distribution system and decorative trim treatment provided in accordance with the present invention so as to not only provide the decorative trim treatment for the doorway and along the wall itself, but for also serving as an electrical distribution system and/or least electrical power wiring or cabling, and preferably for both electrical power cabling and data/com cabling. The wall structure 10 may be of conventional configuration, and comprise a layer of wall board which is supported by a stud based structure that can take any number of different forms. For example, instead of a studded wall, the present invention can also be used on a solid wall, such as referred to in the trade as a block or brick wall. The present invention provides for doorway trim indicated generally at 12, and a chair rail height molding as suggested at 14 together with a baseboard molding 16. The chair rail and baseboard moldings are provided in parallel vertically spaced relationship to one another in accordance with present architectural practices. However, at the juncture between the doorway trim 12$_a$ and the chair rail 14 a rosette block is provided to house an electric switch as best shown in FIG. 2. This block may be provided above chair rail height, and along side the door trim piece. This location may serve to introduce power leads from within the wall structure to the outlet box or block as shown. The present invention entails that the outlet box or block be in the form of a decorative rosette such as that shown immediately above the outlet box of FIG. 2, and more particularly at the juncture between the vertical doorway trim piece 12 and the horizontal doorway trim piece 12$_b$ which is provided above the doorway itself.

The rosette block 14 is of conventional external decorative configuration, but may be provided in accordance with the present invention in the form of a hollow block with a cover and a base so as to afford an entry point for the power leads as described above with reference to FIG. 2, and/or to provide a connection between the doorway trim pieces 12$_a$ and 12$_b$ as described above with particular reference to FIG. 2.

Figure 6:
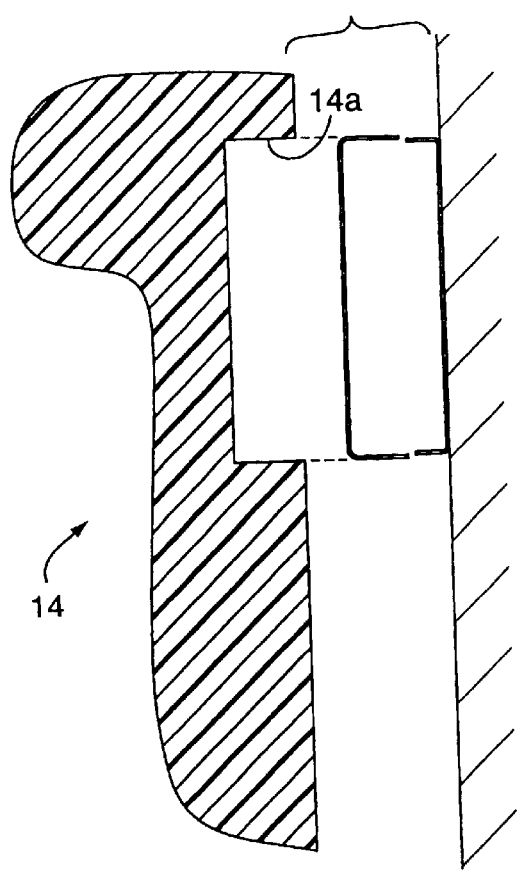
FIG. 6 is an exploded sectional view taken generally on the line 6—6 of FIG. 1 and shows a two piece raceway with the base mounted to the wall and a cover snapped onto the base so that the chair rail can receive the raceway in the recess provided in its rear surface.
Figure 7:
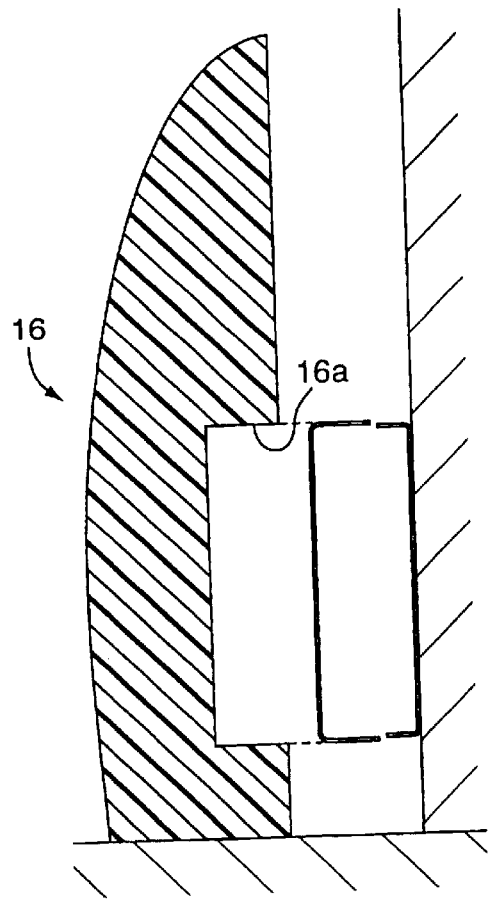
FIG. 7 is a view similar to FIG. 6 but taken on the line 7—7 of FIG. 1.
Figure 10:
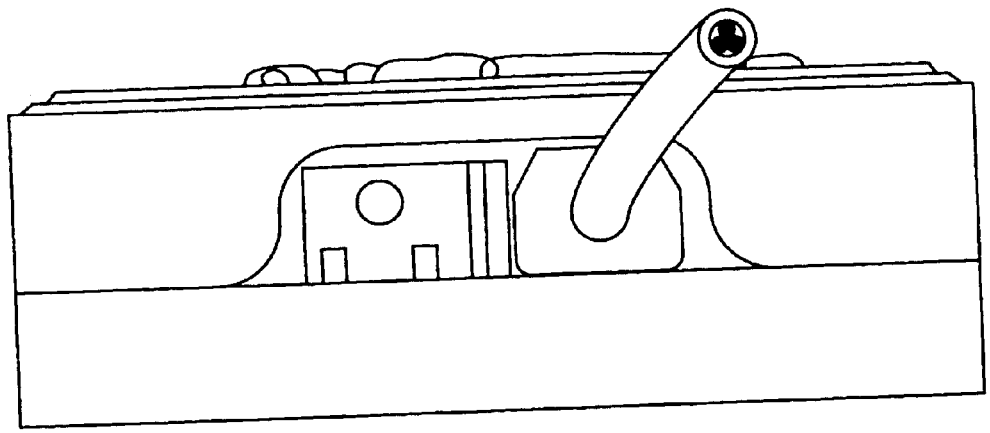
FIG. 10 shows the FIG. 9 rosette block from below, with a power cord plugged into the hidden outlet device.
Figure 20:
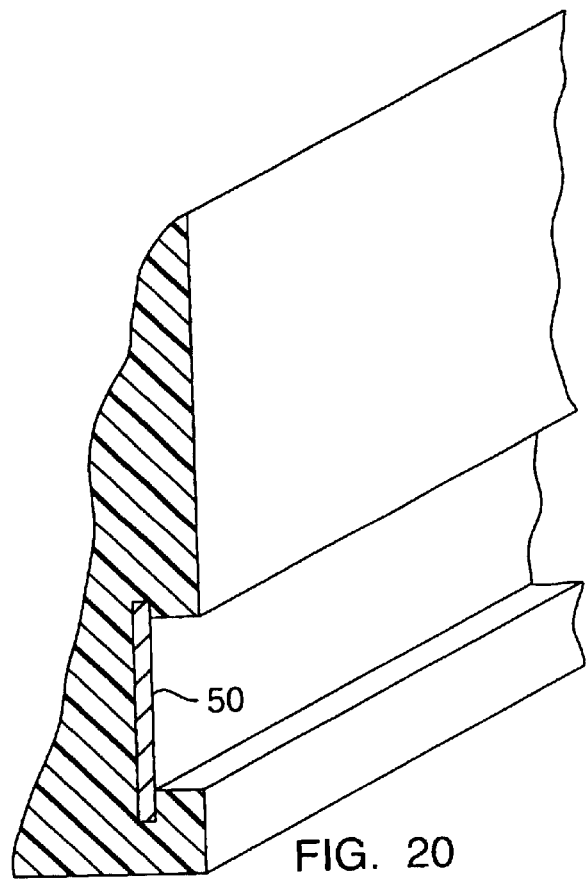
FIG. 20 is a cross sectional view through another embodiment of the invention.

It is an important feature of the present invention that the decorative trim pieces surrounding the doorway 12, together with the chair rail and baseboard trim pieces 14 and 16, each have not only the decorative front face as commonly used as such moldings generally but also include rearwardly open recesses such as those suggested in FIGS. 6 and 7 as well as FIG. 20. Thus, each trim piece whether of the variety used to define the chair rail 14 or that of the baseboard is or around doorway or window, each share the common characteristic that they are basically of constant cross section and have a front facing exposed surface which defines a decorative molding. Such trim pieces further include a back or rear surface which abut the existing wall surface 10. These which rearwardly or back surfaces define elongated recesses to accommodate power and/or data cabling. Thus, the electrical power leads can be run around doorways and windows and along chair rail moldings and baseboard moldings to power the outlet devices which will be described in greater detail with reference to FIGS. 5 and 13, here below.

It is a feature of the present invention that the installer of the raceway, such as shown in FIG. 5 and 6, can mount such raceway to the wall, and do the same for the rosette block base, so that the wiring can be completely installed by a licensed electrician if necessary. As a second step, the finish carpenter can then apply the trim pieces, and the rosette block cover portions (of the type shown in FIGS. 11 and 12 for example) to these underlying components after the electrician has finished his installation. It will also be apparent that the space so filled with the components of the present invention can be easily reconfigured and even redecorated with trim pieces of alternative design.

Figure 13:
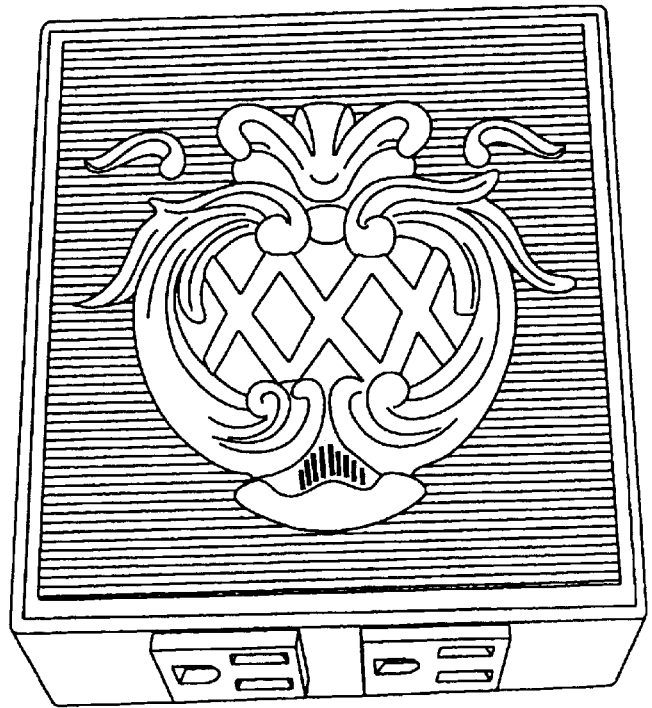
FIG. 13 shows a chair rail type rosette block having an outlet device or data/telecomm device provided in the lower or downwardly facing edge.
Figure 14:
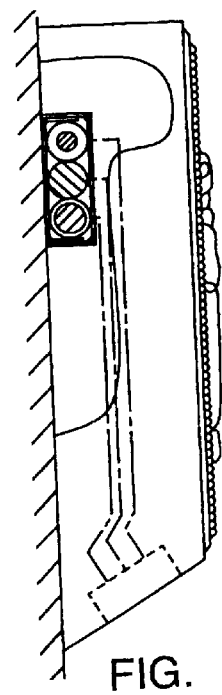
FIG. 14 is a side elevational view of FIG. 13 to show the chair rail profile and raceway that about the lateral side(s) of the rosette block and connect to the outlet plug(s) in the lower and downwardly facing edge.
Figure 15:
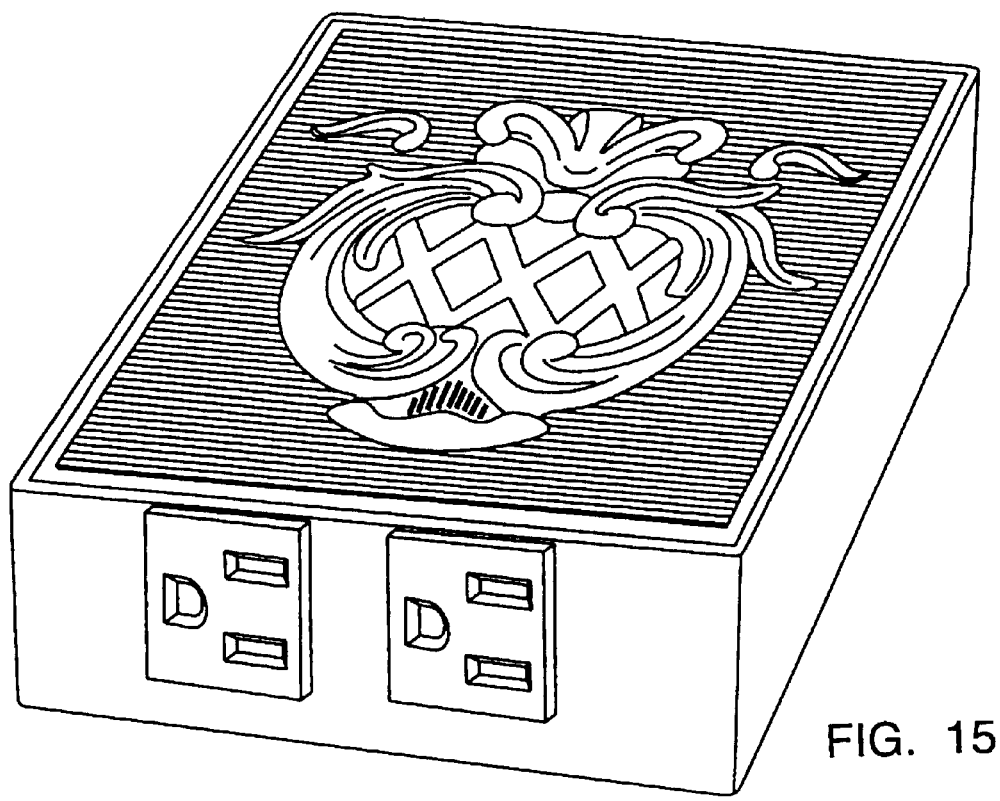
FIG. 15 is a perspective bottom quartering view of the rosette block shown in FIGS. 13 and 14.

It is an important feature of the present invention that the use of the rosette blocks such as shown at 14, in FIG. 2 as well as at 18 in FIG. 1 are hollow and include at least a base and a cover portion to allow communication for the electrical wiring between recesses in the trim pieces and the abutting rosette blocks. A typical such rosette block is shown in greater detail with reference to FIGS. 9, 10, 11 and 12. A modified version is illustrated in FIGS. 13, 14 and 15.

As mentioned above, reconfiguring a space filled out with these components is readily accomplished. Also, one might want to add additional electrical devices at locations where rosette blocks are available to do so.

Figure 16:
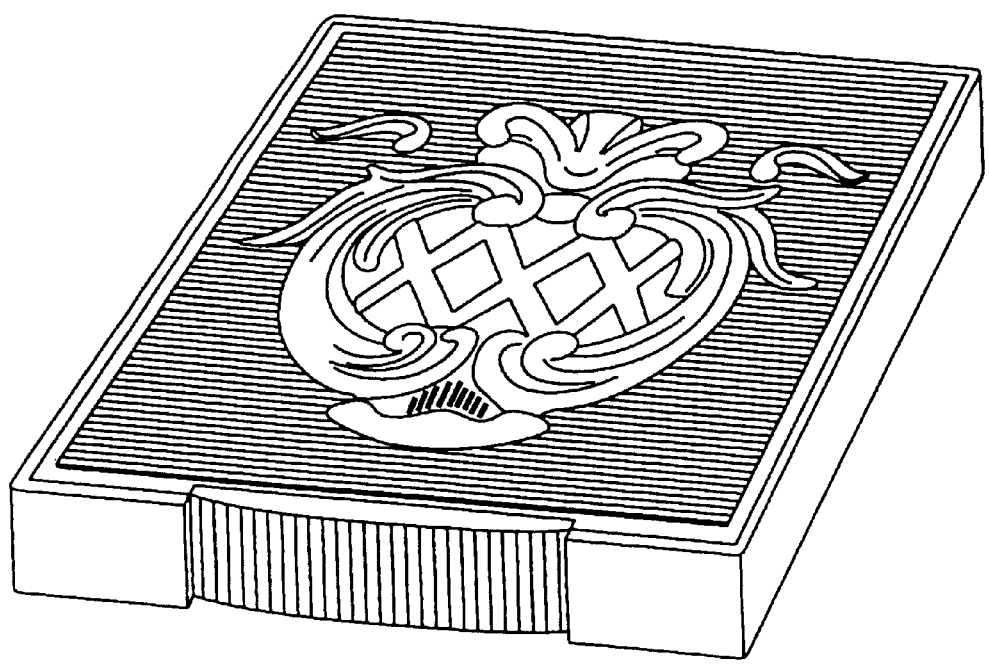
FIG. 16 is a perspective view of another rosette block adapted for use at chair rail height, and provided with an electrical lamp and lens on the lower downwardly facing edge thereof.

FIG. 16 shows still another rosette block which not only serves to provide a passageway to communicate the recess in the back of the adjacent trim pieces but which also has the capability of providing indirect lighting to the space defined by the wall 10, and includes a lamp which directs light downwardly through the lower edge of the rosette block through a lens.

Figure 17:
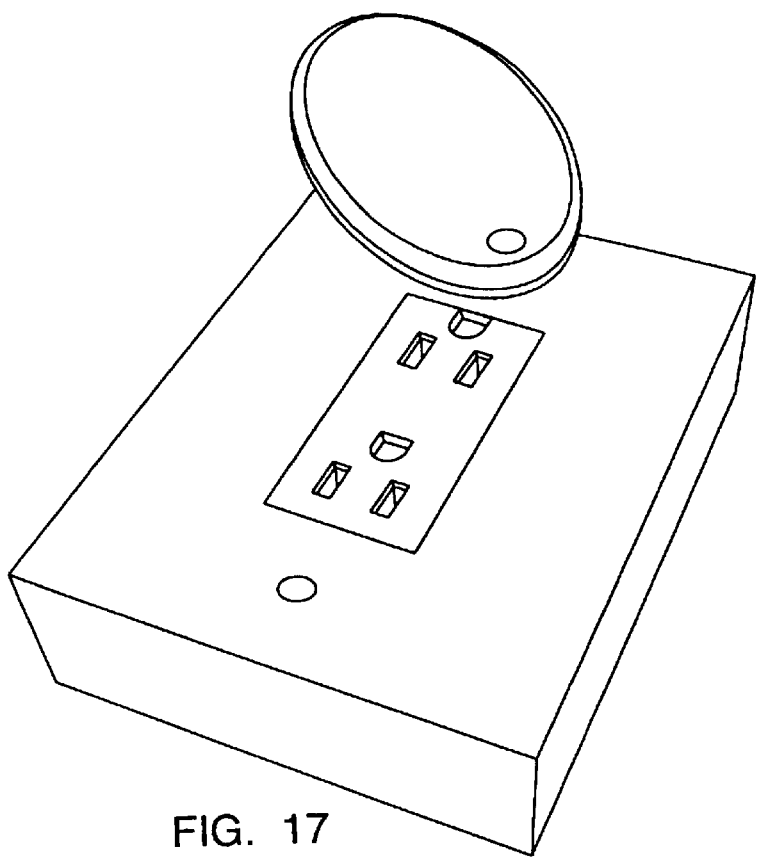
FIG. 17 is a perspective view of still another rosette block for chair rail height, and provided with a cover of a shape suitable for decorative effect when closed (see FIG. 18).
Figure 18:
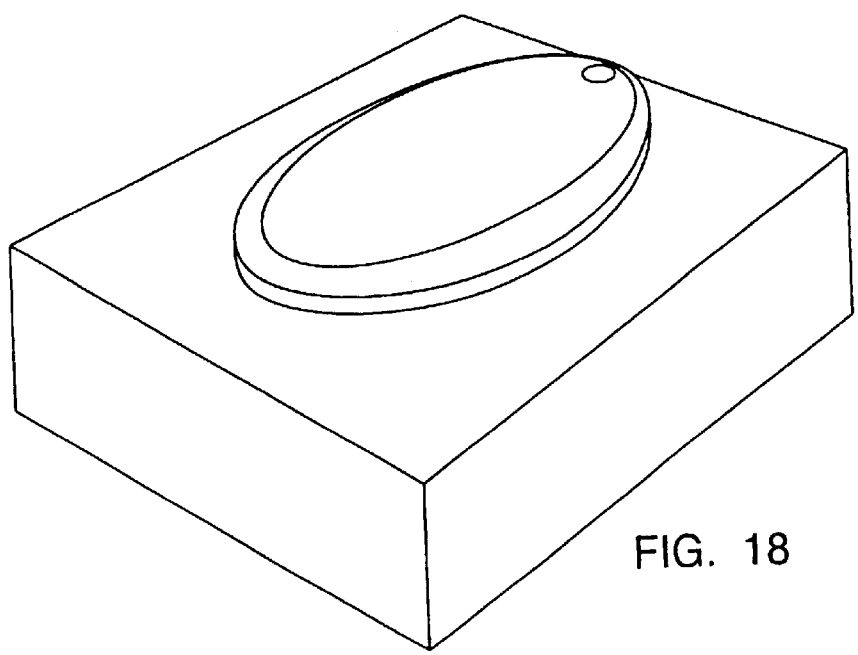
FIG. 18 shows the cover of FIG. 17 in closed position.

FIGS. 17 and 18 show still another version of the rosette block where a swinging cover is adapted to be moved on top of a duplex outlet plug so as to provide a decorative front finish to the rosette block when the outlet plug is not in use. The cover is preferably of molded decorative finish and may for example, have the shape and surface texture of a pineapple.

Figure 19:
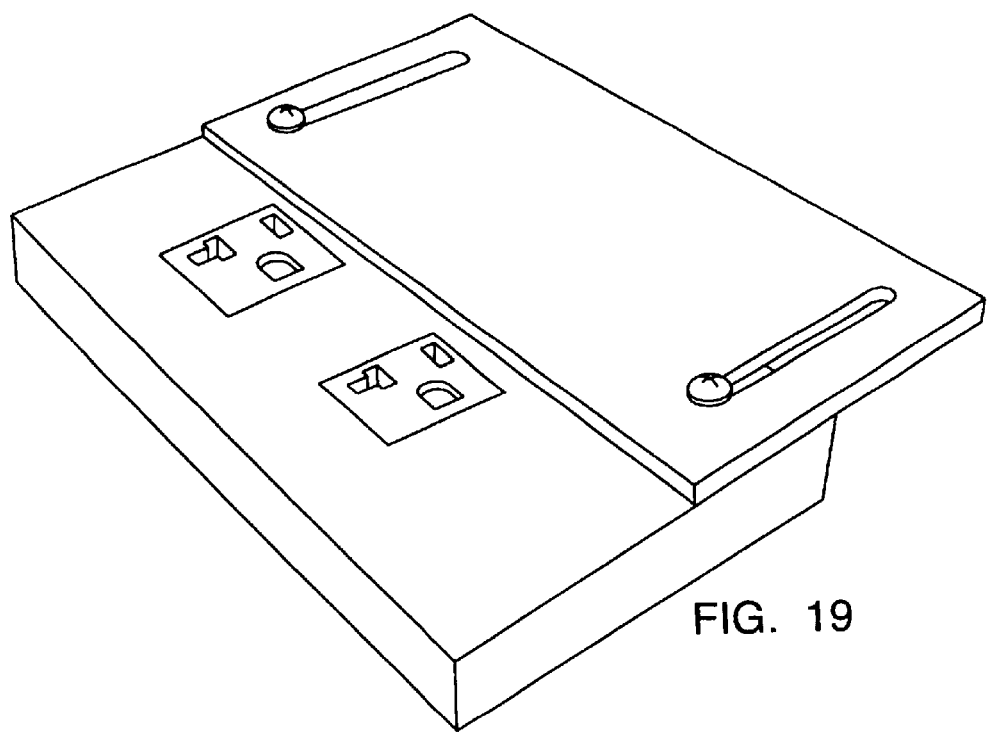
FIG. 19 is similar to FIG. 17 but shows still another slidable cover configuration.

FIG. 19 shows still another version of such a rosette block, wherein the cover slides vertically upwardly to provide access to the outlet.

In summary, a rosette block of the present invention is adapted to abut at least one end of at least one elongated decorative trim piece and to define a housing that is hollow and adapted to receive an electrical device such as a duplex outlet plug or lamp or even a jack of the type used with the cabling carrying telecommunication and data signals. It is a feature of the present invention, for example, that the baseboard 16 might be used to distribute the electrical power to outlet devices such that as shown at 3 in FIG. 1, whereas the chair rail 14 might be used as the wireway for containing the data and telecommunication cabling or low voltage wiring associated with telecommunication and computer systems generally.

Obviously, the arrangement can be reversed, and the data/telecommunication cabling might be carried in the baseboard 16 whereas the electrical power cables might be provided in the chair rail trim piece 14.

Figure 4:
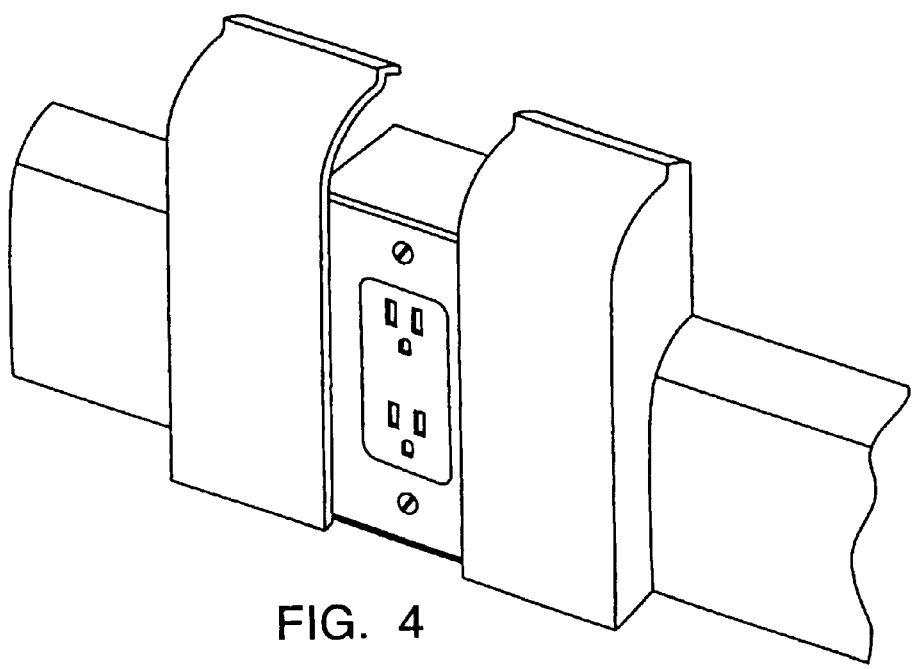
FIG. 4 is a detailed view of the FIG. 3 outlet box in its opened position.

As shown in FIG. 3 various approached can be taken to disguising the utilitarian electrical outlet plug in accordance with the present invention. FIGS. 3 and 4 shows a split cover that can be slid to expose the outlet plug. FIG. 3 shows the covers in the closed condition, whereas FIG. 4 shows the covers slid to the open position.

FIG. 5 shows a rosette block having a duplex outlet plug provided therein. To create the impression of a rosette as described previously with reference to the block 14, a small plug 20 can be inserted into the outlet plug.

FIGS. 6 and 7 show the chair rail 14 and baseboard 16 in greater detail, and reveals several possible treatments for the recesses defined in the rearwardly facing surfaces of these trim pieces 14 and 16. More particularly, the recess 14a and the chair rail 14 can receive a small rectangular raceway of two components (cover and base) construction so as to protect the wiring or cables within the raceway from damage, and to better insulate the wiring from the possibility of ground faults in the event the cabling is such as to require this feature. More particularly, base and cover may be of any suitable material such as a polymeric plastic material, or may instead be of metal or a combination of the two, the base being plastic and the cover being of metal.

FIG. 7 shows a simpler raceway configuration were the raceway is a one piece construction being bent into a U-shaped of a suitable metal such as steel and held in place on the wall by mounting strips. Once so installed on the wall the chair rail or baseboard can be conveniently adhered to the wall either by conventional fasteners or might instead be adhesively applied.

It is an important feature of the present invention that the molded trim pieces be fabricated from a resinous synthetic material of foam consistency, together with a photographically producible wood grain or paintable outer surface. It is a further feature of the present invention that these trim pieces may be molded with a metal protective strip embedded in the foam in order to avoid damage to the wiring ultimately contained in the rearwardly facing recess of the trim piece when the user installs the trim piece on the wall, in particularly in the situation where the installation calls for nailing the trim pieces in place.

Figure 11:
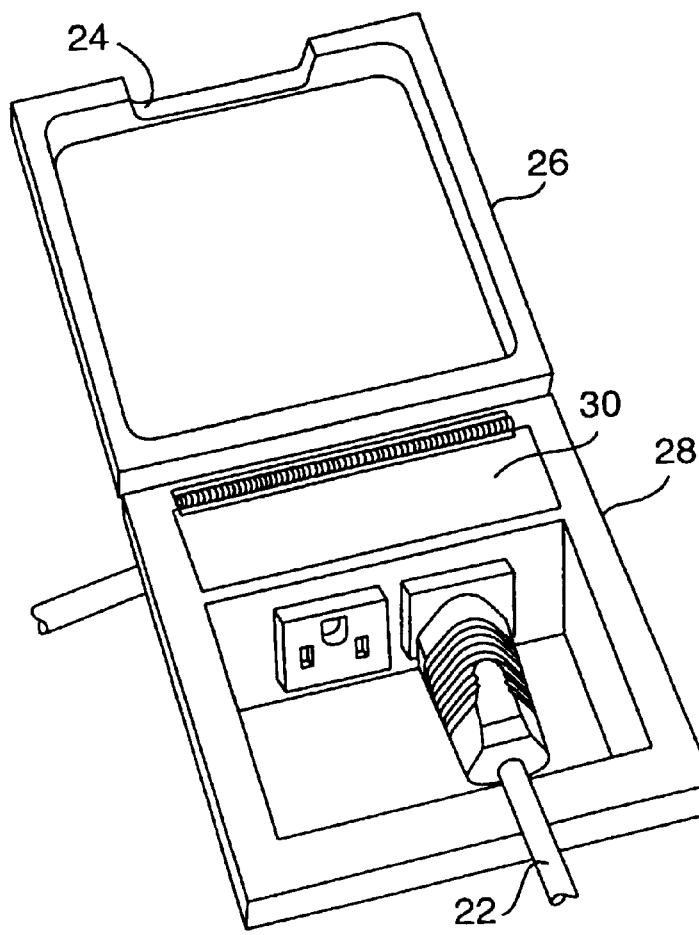
FIG. 11 shows the FIG. 9 rosette block with the cover portion opened and the base portion with the power cord plugged in per FIG. 10.
Figure 12:
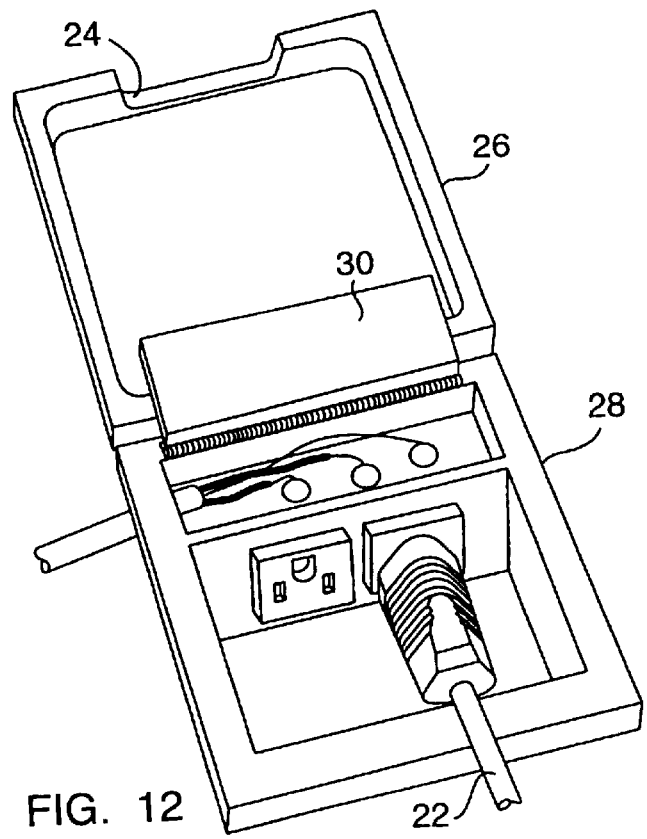
FIG. 12 shows the FIG. 9 rosette block with the cover portion opened and with an inside cover also opened to reveal the electrical connections.

FIGS. 11 and 12 show a form of rosette block where the power cord 22 to be connected to the outlet device in the rosette block extends downwardly from the rosette block through a slot 24 provided in the cover 26 of the rosette block. The cover 26 is hinged to the base 28 of the rosette block, which base is preferably fabricated from a molded synthetic material and is recessed to provide and opening for receiving an outlet plug 22. A small cover in the base 30 is adapted to be hinged at its top edge for access to the leads associated with the outlet device as best shown at FIG. 12.

FIG. 20 shows a polymeric foam plastic trim piece that has a front face defining a decorative molding, a core of foamed plastic, and a rear face with a recess to receive a metal or plastic raceway. A protective shield 50 is molded into the trim piece to provide protection in the event no raceway is used.

The above described embodiments of the invention represent presently preferred versions thereof and should not be taken as limiting the scope of the present invention. More particularly, the scope of the present invention should instead be limited solely be the scope of the appended claims, the invention being such as to be practiced otherwise than as specifically described.

Although not preferably shown, it will be apparent that T-shaped fittings, as well as inside and outside elbows, can be utilized to run the wiring between trim pieces that oriented at substantial angles relative to one another.

Another feature of the invention, not specifically shown, but nevertheless within its scope, is the provision for more than one elongated recess in the trim piece to accommodate additional wiring and to separate wiring of different voltage, such as power and data/communication carrying capability.

I claim:

1. A combined electrical distribution system and decorative trim treatment for wall mounting, and comprising in combination at least one elongated trim piece of constant cross section and having a front facing exposed surface defining a decorative molding, said trim piece having a back surface for abutting an existing wall surface, said trim piece defining at least one rearwardly open elongated recess to accommodate wiring, a shield shaped to be received in said elongated recess of said trim piece in said rearwardly open recess to protect the wiring provided therein, and at least one rosette block abutting one end of said trim piece; said rosette block defining a cavity for receiving an electrical device said cavity communicating with said elongated recess in said trim piece whereby wiring in said elongated recess can be electrically connected to the electrical device.

2. The combination of claim 1 further comprising at least one vertically oriented door frame trim piece of constant cross section and having one end abutting a second rosette block, said second rosette block also communicating with a recess in the rear surface of said door frame trim piece to accommodate the wiring therebetween.

3. The combination of claim 2 wherein said at least one elongated trim piece has said elongated recess communicating with said second rosette block, and a second elongated trim piece parallel said at last one elongated trim piece to define both baseboard and chair rail trim abutting said second rosette block provided in said door frame trim.

4. The combination of claim 3 further comprising elongated raceway defining components in said elongated recess to accommodate and to protect the wiring contained therein.

5. The combination of claim 4 wherein said raceway defining components are secured to the wall independently of said elongated trim pieces to provide greater flexibility in installation.

6. The combination of claim 1 wherein said rosette block has a base and a cover movably mounted to said base to provide access to the electrical device.

7. The combination of claim 6 further characterized by additional elongated trim pieces and complementary rosette blocks that are generally similar in external appearance as mounted on the wall to those that are fitted to the wall to cover the raceway and rosette block base.

\* \* \* \* \*